(No Model.) 3 Sheets—Sheet 1.

A. J. WRIGHT.
STEAM SEPARATOR.

No. 492,082. Patented Feb. 21, 1893.

WITNESSES
Myron B. Forer.
Sam Printess

INVENTOR
Allen J. Wright
by C. M. More
ATTORNEY (No Model.) 3 Sheets—Sheet 2.

A. J. WRIGHT.
STEAM SEPARATOR.

No. 492,082. Patented Feb. 21, 1893.

WITNESSES
Myron B. Vorev.
Corn Printiss

INVENTOR
Allen J. Wright
by
ATTORNEY (No Model.) 3 Sheets—Sheet 3.

A. J. WRIGHT.
STEAM SEPARATOR.

No. 492,082. Patented Feb. 21, 1893.

WITNESSES
Myron B. Vorce.
Lorin Printed

INVENTOR
Allen J. Wright
by
ATTORNEY

UNITED STATES PATENT OFFICE.

ALLEN J. WRIGHT, OF CLEVELAND, OHIO.

STEAM-SEPARATOR.

SPECIFICATION forming part of Letters Patent No. 492,082, dated February 21, 1893.

Application filed April 18, 1892. Serial No. 429,565. (No model.)

*To all whom it may concern:*

Be it known that I, ALLEN J. WRIGHT, a citizen of the United States, residing at Cleveland, in the county of Cuyahoga and State of Ohio, have invented certain new and useful Improvements in Steam-Separators; and I do hereby declare the following to be a full, clear, and exact description of the invention, such as will enable others skilled in the art to which it appertains to make and use the same.

The object of the invention is to separate from live steam the water mechanically carried therewith and to collect such water and the water of condensation which may be present or accumulate in the pipes, so as to supply dry steam to the engine, or for other use, and it consists in the features of construction and arrangement hereinafter described and specifically claimed.

Figure 1:
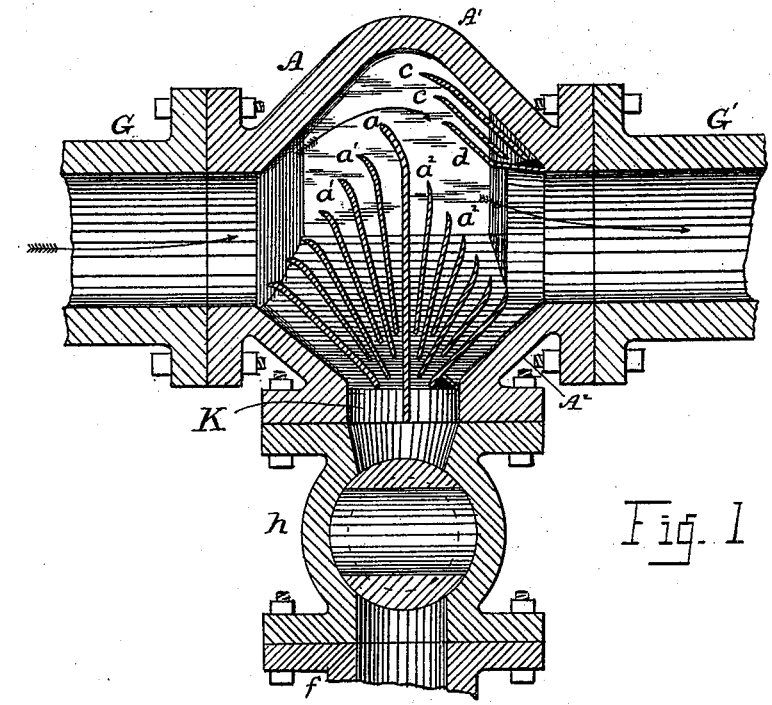
Figure 6:
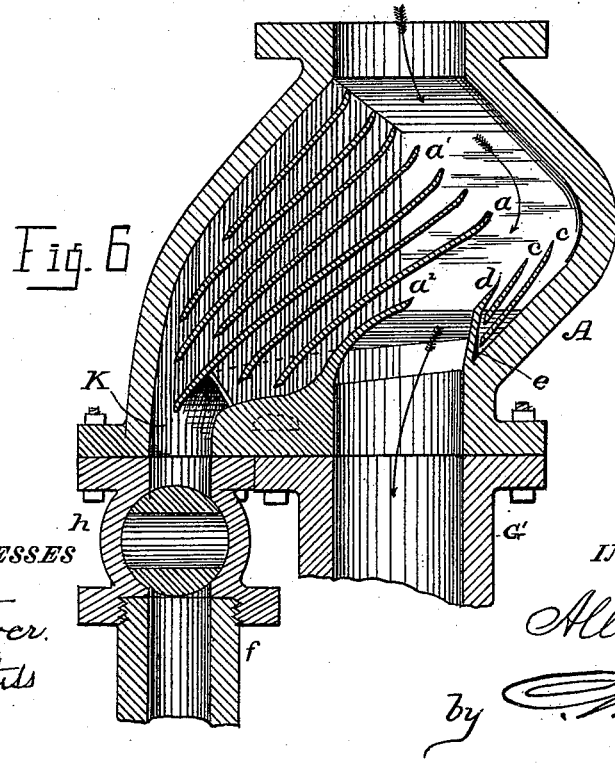
Figure 2:
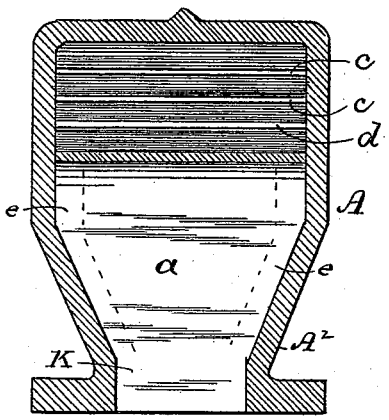
Figure 3:
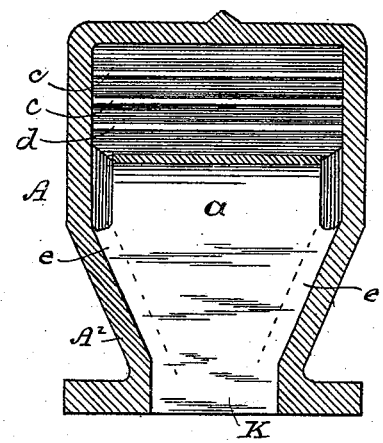
Figure 4:
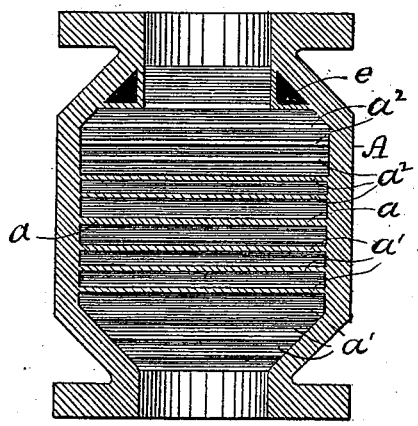
Figure 5:
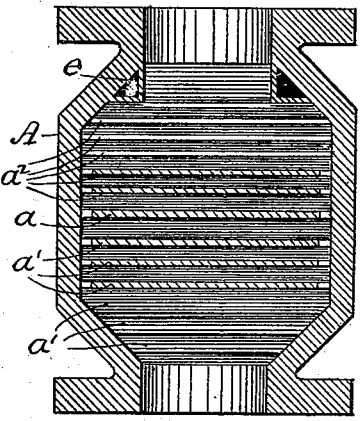
Figure 7:
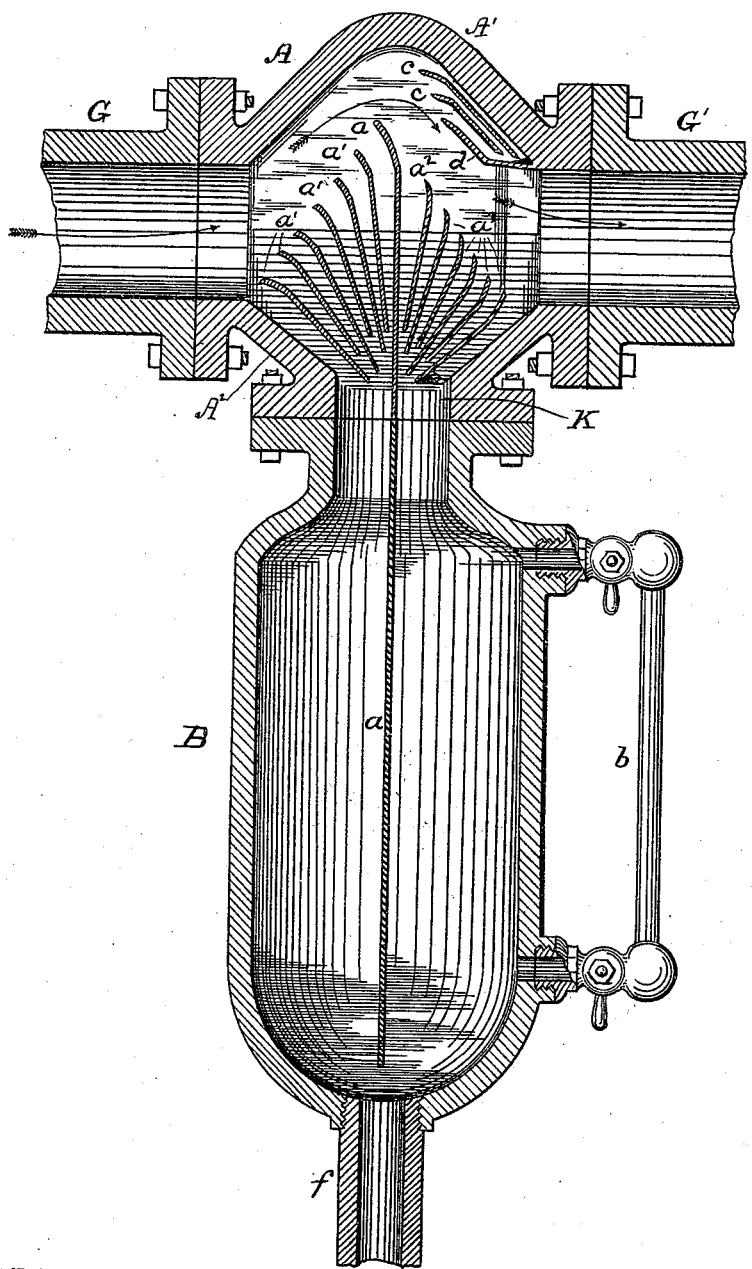

In the accompanying drawings Figure 1 is a central longitudinal section of the separator with its pipe connections attached; Figs. 2 and 3 are central transverse sections of the separator chamber alone; Figs. 4 and 5 are central longitudinal sections, in a horizontal plane, of the same structure shown respectively in Figs. 2 and 3. Figs. 6 and 7 are central longitudinal sections of the separator chamber and connections, Figs. 3, 6 and 7 showing various modifications of structure, and all of the foregoing sections being taken in a vertical plane.

In the drawings A represents the separator chamber, A' its expanded upper part, forming the steam passage, $A^2$ its lower part, below the line of steam inlet and outlet, forming the water receptacle.

$a$, $a'$, $a^2$, represent baffle plates disposed in the separator chamber to intercept the steam current and separate the water therefrom.

B represents an auxiliary water chamber, $b$ a water gage.

$c$ and $d$ represent auxiliary baffle plates.

$e$ is a water channel.

$f$ represents the water outlet pipe, $h$ a cock or valve located therein.

G represents the steam inlet pipe and G' the steam outlet pipe, the arrows indicate the course of the steam.

K represents the neck or outlet of the chamber A through which the water collected in the chamber escapes to the outlet pipe $f$, directly or through the auxiliary water chamber B, as the circumstances may require.

The advantages of using dry steam and the danger of allowing condensed or unvaporized water to reach the engine cylinder are too well known to need recital, and various devices have been adopted to intercept and collect such water, among which that of a chamber containing plates or webs, known as "baffle-plates," has been employed in a variety of forms, but so constructed that more or less of the intercepted water must fall or pass through the current of steam on its way to the water receptacle. The properties of steam are such that it will take up mechanically more or less water from water falling through it, or over which it passes in a current, hence such construction has been ineffective to separate all of the entrained water from the steam, since much of the water once separated is taken up again and carried on by the current of steam, and this notwithstanding the steam may be passing vertically upward and the water dropping or flowing downward by gravity.

I avoid the foregoing difficulty by arranging the separator so that the steam is forced to pass upward and across the edges of the baffle plate or plates, circulating but little or not at all between them, while the water deposited by the steam passes directly downward to its receptacle with no contact, or scarcely any, with the current or circulation of steam.

In its essential features my improved separator consists of a chamber having a water-space at its lower part and extending at its upper part above the steam inlet, in which chamber upwardly extending baffle-plates are interposed in the path of the steam current with their lower ends extending to the water space and their upper ends preferably inclined so as to meet the current of steam at an angle, so as to force the steam to pass upward across the ends of the plates; escape for the intercepted water being provided at the lower ends of the plates, and an outlet at the lower part of the chamber, from which the accumulated water may continuously or from time to time be allowed to escape to any desired point of disposition.

It is evident to those familiar with the behavior of steam in a confined space that the number and arrangement of the baffle plates in a separator may, within certain limits, be considerably varied, with corresponding changes of form and location, and yet accomplish in greater or less degree the same result; hence I desire it understood that neither the number, the form, or the precise arrangement of the plates is essential to my invention so long as the above described essential features are retained, as variations in the number, form, or arrangement of the plates have to do merely with the degree of efficiency, and not with the essential mode of operation of the device.

I will proceed first to describe the preferred form of the apparatus, and afterward to point out modifications of construction which may be adopted without departing from my invention.

The separator chamber A is expanded both laterally and vertically, as shown in Figs. 1, 2, 4 &c.; its lower portion extending below the steam inlet and outlet sufficiently to give the desired water capacity and terminating in the neck K at its lowest part, with which the water outlet pipe $f$ is connected, directly or with the valve $h$ interposed, which I prefer in most cases. The pipe $f$ may lead directly back to the boiler, or to an ordinary steam trap, as may be preferred. The baffle plates $a, a', a^2$, &c. are arranged in the lower part of the chamber A and extend upward, increasing progressively in height as they approach the top A' of the chamber, at which point the highest plate $a$ is located and extends so near to the top of the chamber that the space between it and the wall of the chamber shall be substantially the same in area as that of the inlet and outlet passages of the chamber A, in order to avoid wire-drawing the steam. When a current of steam impinges upon a surface disposed transversely to its course a large part of the entrained water which it carries is, by the force of the impact, atomized and thrown back into the current of steam, by which it is instantly taken up again and carried forward, a small portion only being held by capillary attraction upon the plate, but if the surface against which the steam impinges be inclined at a somewhat acute angle to the direction of the current, the water, instead of being atomized, is almost wholly retained upon the plate. For this reason I prefer to arrange the baffle plates $a'$ at an acute angle to the entering current of steam, as seen in Fig. 1 &c. but as the steam parts with more of its entrained water at each successive plate, the plates may be placed successively more erect without impairing their efficiency, until finally the highest plate $a$ may be placed vertical, but is preferably slightly curved at its top toward the entering current of steam. The baffle plates may all stand vertical or nearly so, and yet be effective, but in such case their number must be increased, for the reasons stated; conversely, the sharper the angle at which the baffle plates meet the current of steam the fewer plates are needed to intercept all of the water, and if sufficient surface can be given within practicable limits as to size a single plate may do.

The plates $a, a'$ &c. have their lower edges close together but not in contact, so that free escape may be had for the water running down their surfaces. The steam in passing upon the baffle plates spreads out into a wide but not deep layer, which greatly facilitates the depositing of the water which it carries, besides this, the impinging of the steam upon the inclined plates, the spaces between which remain filled with dead steam having little or no circulation, causes such eddies of the steam between the edges of the baffle plates and the top of the chamber, and in the outer part of the spaces between the plates themselves, as to cause substantially all of the water carried by the steam to be deposited upon the plates $a, a'$ and the walls of the chamber A, whence it runs down into the lower part $A^2$ of the chamber, and into the neck K, without being exposed to the current of steam sufficiently to be taken up thereby.

The change of direction which the steam current undergoes in passing over the plate $a$ causes it to throw any remaining water which it carries toward the upper part of the exit side of the chamber A, and to intercept this water, which will be very little in amount if any, I introduce one or more smaller baffle-plates $c$, projecting upward toward the current of steam coming over plate $a$, and below these a plate $d$, forming a trough into which any water deposited upon the plates $c$ and the outside of chamber A flows and is carried by passages $e\ e$ down into the lower part or neck of chamber A. On the exit side of the chamber A I prefer to place a decreasing series of baffle plates $a^2$ projecting up from the lower part of the chamber, which have the effect not only of intercepting any remaining traces of water but also of causing the current of steam, now thoroughly dried, to pass more directly through the exit than if the space they occupy was vacant.

The separator is of course placed in any favorable position in the line of steam supply pipe, where it will collect as much as possible of the water of condensation as well as that extracted from the steam. Water will ordinarily stand above the lower end of the plate $a$, and this as well as the disposition of the baffleplates tends to force the steam current toward the top of chamber A. If steam is turned on when the chamber A is empty, it will for a few moments circulate between the plates $a', a^2$, and below the plate $a$, but the water of condensation will speedily rise to the bottom of plate $a$, when such circulation will be stopped, but will in the meantime have heated the plates $a, a', a^2$, sufficiently to prevent their condensing the steam, and they will then act only to intercept and collect the water carried mechanically by the steam.

The plates $a$, $a'$, $a^2$, $c$, and $d$ may be integral with the shell of chamber A, or may be separately formed and inserted. I prefer that the plates $a, a', a^2$, should extend entirely across the chamber A from side to side, forcing all of the steam to pass above them, but they may be separated from the sides of the chamber by a small space at their upper part, as shown in Fig. 3, as such a narrow passage at the sides of the plates will not allow a sufficient circulation of steam between them to interfere with their operation as described, and substantially all of the steam will still pass up across the tops of the plates.

Where it is necessary or desirable to provide a water space greater than can conveniently be given to the chamber A when formed as described, I prolong the neck K into a water chamber B, which is preferably enlarged below, and which may be integral with the chamber A, or may be separately formed and attached to the neck of chamber A, as shown in Fig. 7. The outlet pipe $f$ will in such case be connected to the lower end of chamber B instead of to neck K, and the plate $a$ will be extended to near the bottom of the chamber B. A water gage $b$ may conveniently be attached to the chamber B to indicate the proper time for opening or closing the cock $h$ to regulate the height at which the water stands.

The forms of separator hereinbefore described are adapted to be placed in a horizontal line of pipe. Where it is desired to use the separator in a vertical line of pipe, its form is modified as shown in Fig. 6, without changing the essential features of construction. In such case the neck K is removed from the central position shown in Fig. 1, to the exit of the chamber, which will be the lower end, and is supplied as before with the outlet pipe $f$ and valve $h$, or if needed, with the auxiliary water chamber B. The baffle-plates $a'$ point as before toward the entering current of steam, the plate $a$ standing nearly vertical. The plates $a^2$ may be nearly all dispensed with, while the plates $c$, $d$, are not changed. The channels $e$ pass across the exit end of the chamber A as before and open into the neck K as shown.

What I claim as my invention, and desire to secure by Letters Patent, is—

1. A steam separator consisting of a separating chamber expanded above and having a water space at its lower part with a water outlet connected thereto, and a baffle plate located in said chamber and extending upward from the water space into the line of the steam current, and inclined thereto, and having an open space between its upper end and the top of the chamber, substantially as described.

2. A steam separator consisting of a separating chamber expanded above and having a water space at its lower part below the steam inlet and exit line with a water outlet connected thereto, and a series of baffleplates located in said chamber and extending upward from the water space into the line of steam current and increasing progressively in height and having an open space between its upper end and the top of the chamber, substantially as described.

3. A steam separator consisting of a separating chamber expanded above and having a water space at its lower part with a water outlet connected thereto, and a series of baffle plates located in said chamber and extending from the water space upward into the line of the steam current at an angle therewith and having an open space between its upper end and the top of the chamber, substantially as described.

4. In a steam separator the combination of the separating chamber expanded at its upper part and having a water space at its lower part with a water outlet connected thereto, the baffleplates located in said chamber and extending upward from the water space into the line of the steam current, and the separating plate extending from near the top of said chamber to near the bottom of the water space, substantially as described.

5. In a steam separator the combination of the separating chamber expanded at its upper part and having a water space and outlet at its lower part, the baffle-plate extending from near the top of said chamber to near the bottom of the water space and separating said chamber into two divisions, and the shorter baffle plates arranged in two series, one each side of said separating plate, and extending upward from the water space toward and into the steam current and inclined at an angle thereto, substantially as described.

6. In a steam separator the combination of the separating chamber expanded at its upper part and having a water space and outlet at its lower part, the baffle plates extending upward from the water space into the line of steam current, and the separating plates arranged across the upper part of the exit side of the chamber and having a conducting channel extending downward to the water space, substantially as described.

7. In a steam separator the combination of the separating chamber, the water chamber at its lower part with water outlet thereto, the baffleplates extending from the lower part of the separating chamber upward into the steam current at an angle thereto, the separating plate extending from near the top of the separating chamber to near the bottom of the water chamber, and the separating plates arranged across the upper part of the exit side of the separating chamber and having a conducting channel extending to the lower part of said chamber, substantially as described.

8. In a steam separator the combination of the separating chamber expanded at its upper part and having a water-space and outlet at its lower part, a baffle plate extending upward from the water space into the line of steam current, and the separating plates arranged across the upper part of the exit side of the chamber and having a conducting channel extending downward to the water space, and having an open space between its upper end and the top of the chamber, substantially as described.

9. A steam separator consisting of a separating chamber having a water space at its lower part and a water outlet connected thereto, and a baffleplate or plates located in said chamber and extending upward from the water space into the line of the steam current, and having an open space between its upper end and the top of the chamber, substantially as described.

In testimony whereof I hereto affix my signature in presence of two witnesses.

ALLEN J. WRIGHT.

Witnesses:
LOREN PRENTISS,
WM. G. TAYLOR.